Norman D. Mutchler
INVENTOR.

United States Patent Office 2,793,460
Patented May 28, 1957

2,793,460

FISHING LURE

Norman D. Mutchler, Storm Lake, Iowa, assignor of one-third to Sherman Morton and one-third to Bennett H. Toay, Storm Lake, Iowa Application June 17, 1955, Serial No. 516,291

2 Claims. (Cl. 43—42.26)

The present invention relates to a fishing lure which is expressly, but not necessarily, designed to resemble a crawfish and is suitably constructed to act in an animated manner imitative of the generally known actions of a crawfish.

Crawfish are generally found in fresh water lakes and streams and tend to live on the bottom thereof. Their burrow is generally underneath a rock, a log or in debris on the bottom of the body of water and they rarely approach the surface except in shallow water. When frightened a crawfish swims backward and upward with virtually no zig-zag motion. The line of flight is approximately a straight line from the bottom of the body of water. Its first swimming motion causes cloudiness and muddiness in the water. Naturally, therefore, whatever frightens it is attracted by this disturbance. When its backward swimming motion ceases, the crawfish again sinks to the bottom. These matters are mentioned here to bring out the fact that the lure in the instant case is characterized at the trailing end of the body by a flat circular plate of a diameter greater than the diameter of the cross-sectional diameter of the end of the body to which it is attached. By sloping the plate forwardly and downwardly and attaching at its center, the upper sector is approximately at an obtuse angle to the lengthwise axis of the body, and the lower segment at an acute angle. It follows that with this arrangement, when the lure is retrieved, using short quick jerky strokes on the line, the action produced resembles that of the natural actions of the crawfish.

It is another object of the invention to provide a balanced lure construction which is such that when the lure is cast it sinks to the bottom n an upright position settling on the bottom with the hook on the top. Appendages are provided, and these extend from the bottom or ventral side of the lure and act as weed guards for the hook, being yet sufficiently flexible and resilient enough that it is possible for the victim fish to be satisfactorily hooked.

Other objects and advantages of the invention will become more readily apparent from the following description and the accompanying drawing.

In the drawings, wherein like numerals are employed to designate like parts throughout the views.

Figure 1:
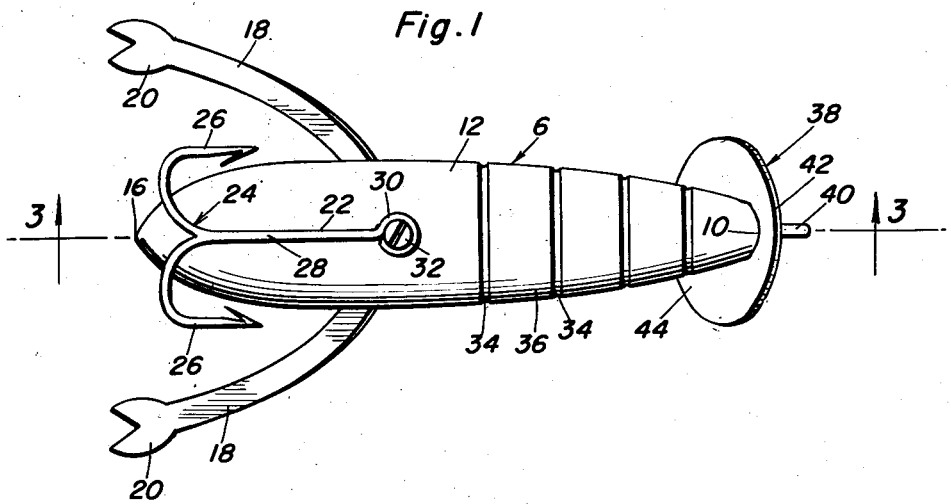
Figure 1 is a plan view of a so-called imitation crawfish constructed in accordance with the invention.
Figure 2:
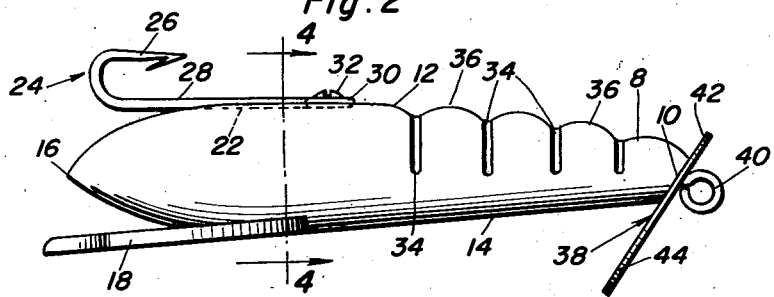
Figure 2 is a side elevation of the same.
Figure 3:
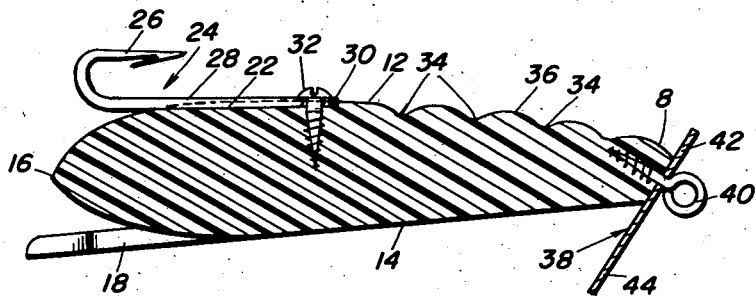
Figure 3 is a section on the line 3—3 of Figure 1.
Figure 4:
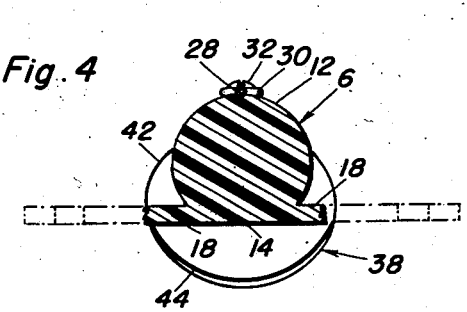
Figure 4 is a transverse section on the line 4—4 of Figure 2.

Referring now to the drawings with the aid of reference numerals, the body as an entity is denoted by the numeral 6. It is preferably of wood or commercial plastics and is approximately 2½ inches long and ⅝ of an inch at the widest part tapering to ⅜ of an inch at the tail. It is ½ inch thick, tapering to ¼ inch at the tail or trailing end. This end of the body is denoted at 8, and is cut at an oblique angle, as at 10. The top or dorsal side or surface is denoted at 12, and the somewhat flat and linearly straight ventral surface is denoted at 14. The intermediate portion is stout, and therefore of the greatest cross-sectional diameter. The leading end is pointed and restricted in resemblance of the desired bait, and it is denoted by the numeral 16. The curvate forwardly extending limbs or appendages are denoted by the numerals 18, and these have their inner ends attached to the ventral side approximately coplanar therewith and at diametrically opposite points. The free end portions are notched and headed, as at 20, and may perhaps extend slightly beyond the leading end. There is a groove 22 lengthwise in the top or ventral side to accommodate the fishhook 24. This may be single or multiple pronged, and the barbed ends are denoted at 26. The shank 28 is fitted into the groove 22 and has an eye 30 secured in place by a wood screw or the like 32. The transverse longitudinally spaced approximately parallel grooves are denoted at 34, and the intervening surfaces are convex, as at 36, and these define imitation swimmeret segments.

The trailing disk or plate is preferably of brass or chromium coated, and is intended to be non-corrodible. It is preferably a flat-faced disk which is denoted generally by the numeral 38. Somewhere near the center, it is formed with a hole, and this apertured portion is fitted against the oblique angled end 10 and the shank of an eye screw 40 is passed therethrough to secure the plate in the desired position. The upper segmental portion 42 is at an obtuse angle to the lengthwise axis of the over-all body, while the lower segmental portion 44 is at an acute angle. Thus, the lower and principal areal portion toes in or, as alternatively described, slants downwardly and forwardly in respect to the ventral side 14.

It will be reasonably clear that this lure is balanced in such a manner that when it is cast, it sinks to the bottom of the lake or stream with the hooks upright and the ventral side facing down. The construction serves to keep the lure substantially weedless and also makes it possible to give it proper life-like actions. When it is retrieved in short quick jerks, the lure swims backwards and upwards, slowly sinking between the jerks, giving it an action in near resemblance of a live crawfish. Since the crawfish provides bait for many fresh water game fishes, the imitation of the same in this presentation can be fully appreciated. In actual practice, the lure will come in several colors from blue-black to bright orange, and it will also be made in two or three sizes, each having its components proportionate to the over-all or finished size.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing lure constructed in imitation of a given Crustacean, a crawfish for instance, comprising a body of the configuration desired and embodying a dorsal side, ventral side, leading end and trailing end, said body having its greatest cross-section at the portion intermediate said leading and trailing ends and the latter end portions tapering in directions away from said intermediate portion, the last named portion having outstanding flexibly resilient appendages, a fishhook mounted atop the leading end portion of said dorsal side, and a flat-faced plate affixed centrally to the trailing end of said body and of an area appreciably greater than the cross-section of the trailing end portion of said body.

2. A fishing lure constructed in imitation of a given Crustacean, a crawfish for instance, comprising a body of the configuration desired and embodying a dorsal side, ventral side, leading end and trailing end, said body having its greatest cross-section at the portion intermediate said leading and trailing ends and the latter end portions tapering in directions away from said intermediate portion, the last named portion having outstanding flexibly resilient appendages, a fishhook mounted atop the leading end portion of said dorsal side, and a flat-faced discoidal plate detachably and centrally affixed to the trailing end of said body and of a diameter greater than the cross-sectional diameter of the adjacent trailing end portion of said body, and having its upper segmental portion at an oblique angle to the lengthwise axis of the body and its lower segmental portion at an acute angle and therefore toed downwardly and forwardly in respect to the ventral side of the body.

References Cited in the file of this patent

UNITED STATES PATENTS

| | | |
|---|---|---|
| 1,813,722 | Wright | July 7, 1931 |
| 1,893,686 | Schilpp | Jan. 10, 1933 |
| 2,569,165 | Hall | Sept. 25, 1951 |